(12) United States Patent
Ruggiero (10) Patent No.: US 11,467,100 B2
(45) Date of Patent: Oct. 11, 2022

(54) IMAGING ELEMENT FOR A BORESCOPE (71) Applicant: General Electric Company, Schenectady, NY (US)

(72) Inventor: Eric John Ruggiero, West Chester, OH (US)

(73) Assignee: General Electric Company, Schenectady, NY (US)

( * ) Notice: Subject to any disclaimer, the term of this patent is extended or adjusted under 35 U.S.C. 154(b) by 652 days.

(21) Appl. No.: 15/671,502

(22) Filed: Aug. 8, 2017

(65) Prior Publication Data

US 2019/0049392 A1 Feb. 14, 2019

(51) Int. Cl.
| | |
|---|---|
| *G01N 21/954* | (2006.01) |
| *H04N 5/232* | (2006.01) |
| *H04N 7/18* | (2006.01) |
| *G02B 23/24* | (2006.01) |
| *G02B 3/00* | (2006.01) |
| *G02B 27/00* | (2006.01) |
| *G02B 23/26* | (2006.01) |
| *H04N 5/225* | (2006.01) |

(52) U.S. Cl.
CPC ......... *G01N 21/954* (2013.01); *G02B 3/0056* (2013.01); *G02B 23/243* (2013.01); *G02B 23/2484* (2013.01); *G02B 27/0075* (2013.01); *H04N 5/23293* (2013.01); *H04N 7/183* (2013.01); *G02B 23/2461* (2013.01); *G02B 23/26* (2013.01); *H04N 2005/2255* (2013.01)

(58) Field of Classification Search
CPC .. G01N 21/954; H04N 5/23293; H04N 7/183; H04N 2005/2255; G02B 23/243; G02B 3/0056; G02B 23/26; G02B 23/2461; G02B 23/2484
See application file for complete search history.

(56) References Cited

U.S. PATENT DOCUMENTS

| | | | |
|---|---|---|---|
| 5,549,542 A | 8/1996 | Kovalcheck | |
| 6,124,974 A | 9/2000 | Burger | |
| 6,134,003 A | 10/2000 | Tearney et al. | |
| 6,483,535 B1 | 11/2002 | Tamburrino et al. | |
| 6,793,399 B1 | 9/2004 | Nguyen | |
| 2010/0016662 A1* | 1/2010 | Salsman | A61B 1/00096 600/109 |
| 2010/0277627 A1* | 11/2010 | Duparre | H01L 27/14603 348/262 |
| 2015/0022655 A1* | 1/2015 | Ruhge | G02B 23/2423 348/82 |
| 2016/0178533 A1 | 6/2016 | Gladnick | |
| 2016/0196643 A1* | 7/2016 | Bendall | G06T 7/50 382/108 |
| 2016/0212335 A1* | 7/2016 | Baleine | H04N 5/23293 |

* cited by examiner

*Primary Examiner* — Tat C Chio
(74) *Attorney, Agent, or Firm* — Fitch, Even, Tabin & Flannery LLP (57) ABSTRACT

A borescope for use within an unlit, closed conduit can include an elongated probe, an artificial light source illuminating the conduit, and a microlens array mounted to the probe. An imaging device can be in data communication with the microlens array.

20 Claims, 8 Drawing Sheets

IMAGING ELEMENT FOR A BORESCOPE

BACKGROUND OF THE INVENTION

Turbine engines, and particularly gas or combustion turbine engines, are rotary engines that extract energy from a flow of pressurized combusted gases passing through the engine onto a multitude of rotating turbine blades.

Borescopes are often used to inspect internal components of assembled turbine engines, such as airfoils or disks, in order to monitor any signs of distress or wear in the components, without having to disassemble all or a portion of the turbine engine. The images generated by borescopes can be viewed in real time by an operator or captured in digital form for later use. It can be beneficial to gather as much data as possible during inspection of a turbine engine component to maximize safety and efficiency.

BRIEF DESCRIPTION OF THE INVENTION

In one aspect, a borescope for producing a composite image within an unlit, closed environment includes an elongated probe having a microlens array located at a first end of the probe used within a closed environment, an artificial light source illuminating a space proximate the microlens array within the closed environment, an imaging device in data communication with the microlens array converting light from the lens array into the composite image, and a memory storing the composite image.

In another aspect, a method for inspecting a turbine engine includes inserting a probe carrying a microlens array carrying at least one lens into an air flow conduit of the turbine engine, moving the guide through the conduit, collecting at least one image from the at least one lens, producing at least one composite image from the at least one collected image, and storing the at least one composite image in a imaging device in data communication with the microlens array.

In yet another aspect, a borescope for inspecting a turbine engine having a core includes an elongated probe having a microlens array on a first end for inspecting the core of the turbine engine having a compressor, combustor, and turbine in axial flow arrangement, a light source illuminating a portion of the core proximate the microlens array, an imaging device in data communication with the microlens array converting light from the lens array into the composite image, and a memory storing the composite image.

DESCRIPTION OF EMBODIMENTS OF THE INVENTION

The described embodiments of the present disclosure are directed to a lens element for a borescope. For purposes of illustration, the present disclosure will be described with respect to a borescope for examining an aircraft turbine engine. It will be understood, however, that the disclosure is not so limited and may have general applicability within an engine, as well as in non-aircraft applications, such as other mobile and non-mobile industrial, commercial, and residential applications.

Borescopes are often used to examine components within engines, where a borescope optical system can include lenses, light sources, or computerized imaging systems capable of capturing image data about an engine component which can be used for inspection or evaluation purposes. Aircraft engine inspections are often performed while the engine remains mounted to the aircraft, and thus borescopes can contain flexible guides to allow for observation of engine components hidden from an outside observer's line of sight.

One example of an imaging system can include a plenoptic system wherein an array of microlenses can be used in place of a single, standard objective lens. Light rays from an object can be focused by the microlens array to form multiple optical images which may be captured by a light-sensitive device such as a CCD or CMOS sensor and stored in an electronic storage medium. The resulting image data can contain spatial information about the object; software post-processing of the image data can provide for manipulation of the image data to selectively change the focal plane/depth of view (for example, focusing on a portion in the foreground or background) or the viewing perspective (for example, tilting the field of view upward or panning to the right).

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
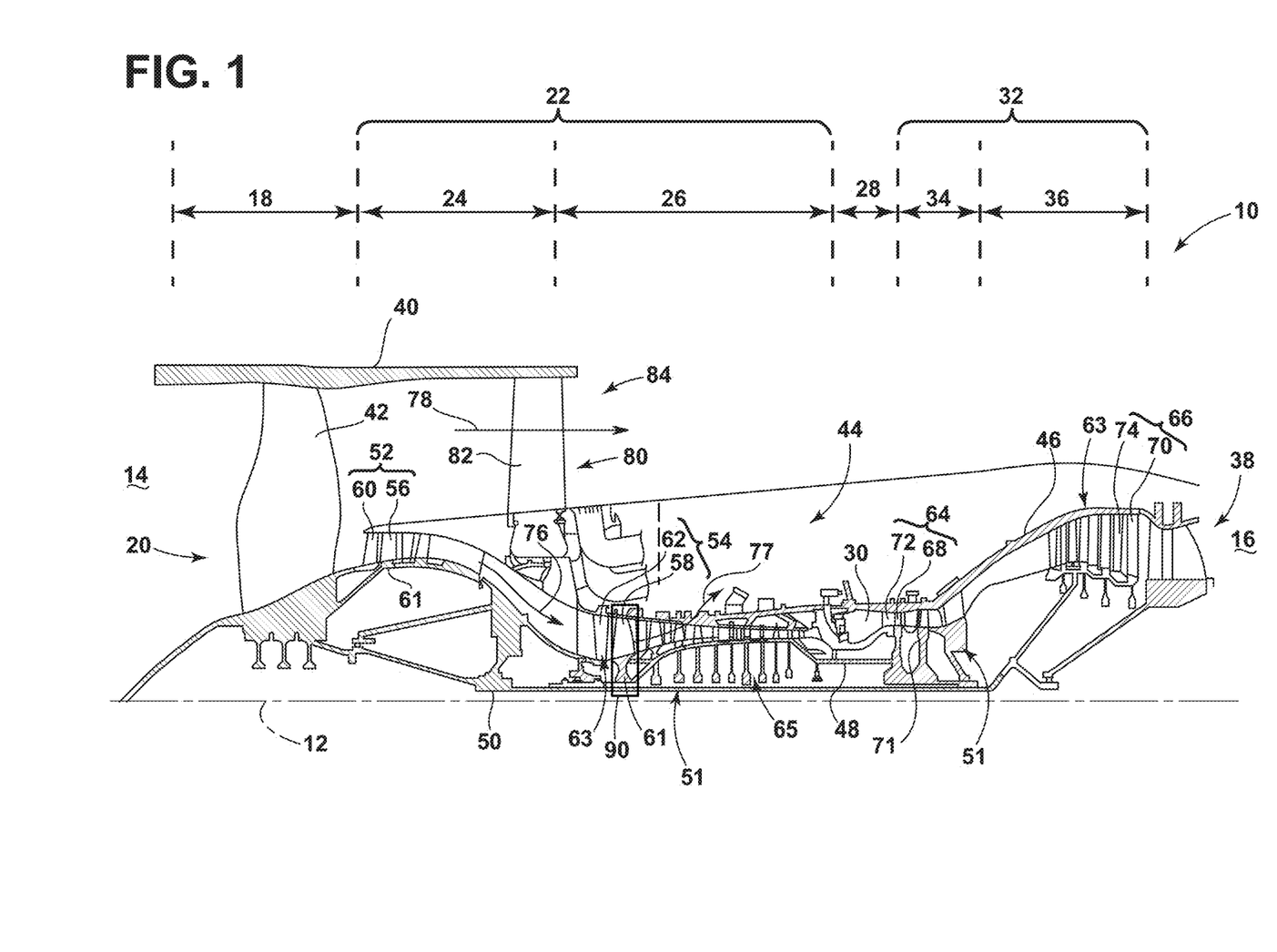
FIG. 1 is a schematic cross-sectional diagram of a turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The blades 56, 58 can be metallurgically bonded to the disk 61 to form a monolithic structure of a blisk 90, an example location and structure as indicated in FIG. 1. The blisk 90 can be one piece when manufactured. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
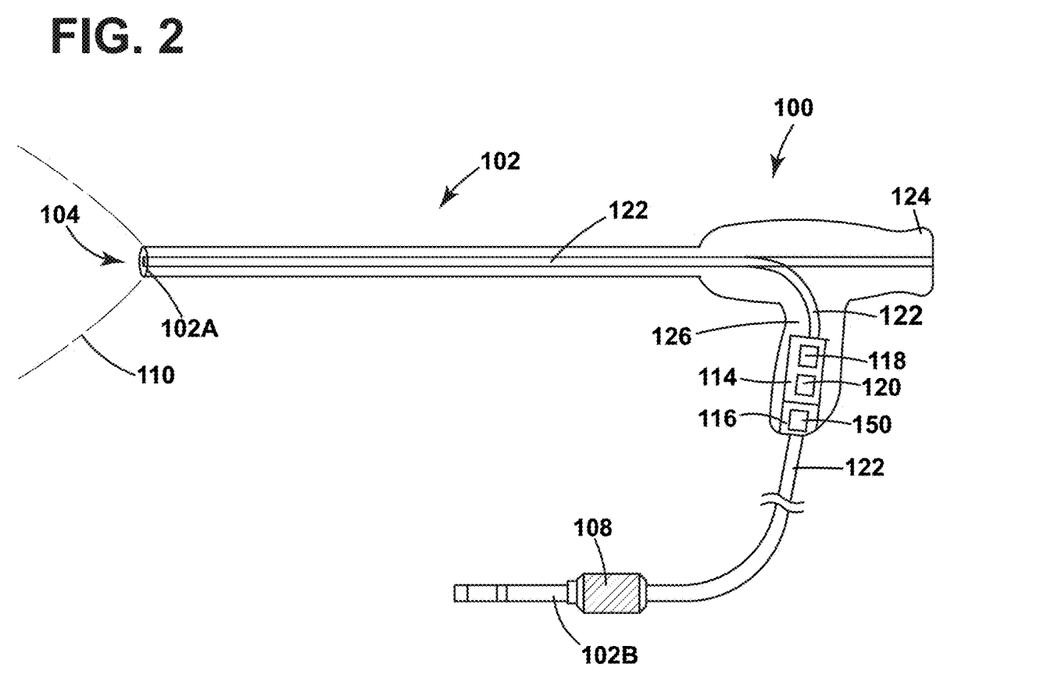
FIG. 2 is a schematic view of a borescope for inspecting the turbine engine of FIG. 1 according to various aspects described herein.

Turning to FIG. 2, an exemplary borescope 100 is illustrated which can be utilized during inspection of components within the turbine engine 10 (FIG. 1). The borescope 100 can include an elongated probe 102, which can be flexible, as well as a microlens array 104 which can be mounted at a first end 102A of the probe 102. An artificial light source 108 can provide light to a region 110 proximate the first end 102A and microlens array 104 as shown. The light source 108 can be positioned at a second end 102B of the probe 102 providing light toward the first end 102A via fiber optic cables or other light guides, or the light source 108 can be disposed at the first end 102A of the probe 102 to illuminate the region 110, in non-limiting examples.

The borescope 100 can also include an imaging device 114 as well as a memory 116. The imaging device 114 can include an imaging sensor 118 and a processor 120 capable of converting light incident on the sensor 118 into an electronic signal. The imaging sensor 118 is illustrated herein as a CCD sensor, and it will be understood that other sensors such as a CMOS sensor can also be used. The imaging device 114 can be connected in data communication to the microlens array 104, such as via a set of fiber optic cables 122. The microlens array 104 can form a plurality of optical images which can be collected by the imaging device 114 to produce a composite image 150, and the composite image 150 can be stored in the memory 116 for further viewing or processing. In this manner, the borescope 100 can function as a plenoptic or light-field camera.

A display 124 can also be mounted to the probe 102 and connected to the microlens array 104 via appropriate cabling which is capable of data transmission, such as fiber optic cables, where the composite image 150 can be observed in real time through the display 124. The display 124 can be positioned in any desired location within the borescope 100, and is illustrated as mounted to a handle portion 126 of the borescope 100.

Figure 3:
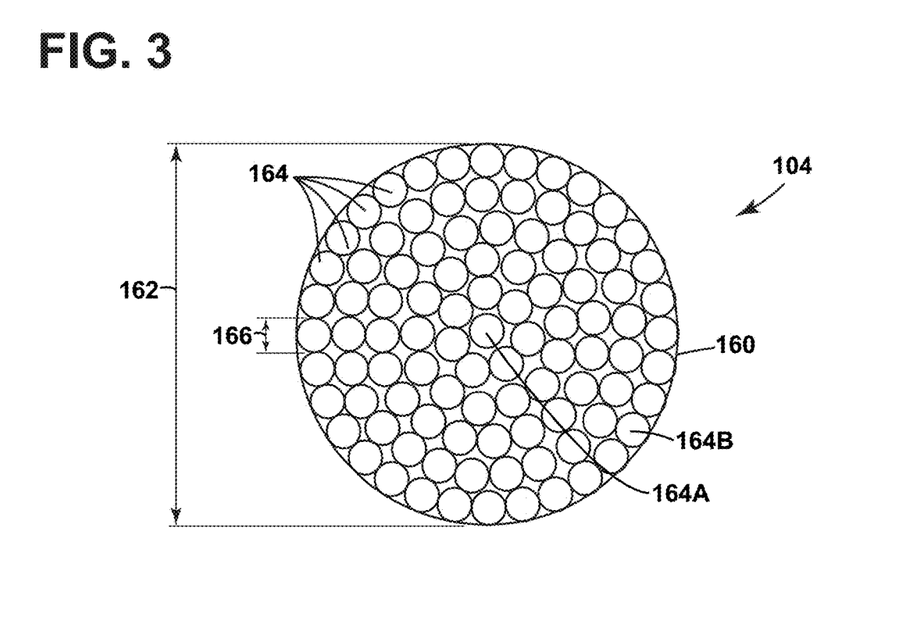
FIG. 3 illustrates a microlens array for the borescope of FIG. 2.

The microlens array 104 is illustrated in further detail in FIG. 3. The array 104 is illustrated herein as a single, circular carrier 160 having an overall diameter 162 where a plurality of individual lenses 164 can be laser-etched into the carrier 160, each lens 164 having a lens diameter 166 as shown. It will be understood that other methods of forming the microlens array 104 can be utilized such as gel trapping or mounting individual discrete lenses in non-limiting examples; in addition, the shape of the carrier 160 or individual lenses 164 can have any geometric profile including cylindrical, rectangular, honeycomb, plano-convex, or positive-meniscus as desired. The individual lenses 164 can all have the same optical properties such as lens diameters 166, focal lengths, or curvatures. It is also contemplated that a subset of the lenses 164 can have differing optical properties; in one non-limiting example, a first lens 164A near the center of the carrier 160 can have a smaller focal length than a second lens 164B near the edge of the carrier 160. In this manner it is possible to tailor the lenses 164 in the microlens array 104 to the desired environment being imaged by the borescope 100.

Each lens 164 in the microlens array 104 can converge incident light to form an optical image on the imaging sensor 118. The imaging device 114 can process the collection of individual optical images based on a plenoptic function which describes the radiance along all light rays in three-dimensional space, and produce the composite image 150 based on the collection of individual optical images from each of the lenses 164; in other words, the composite image 150 is the composite of a plurality of optical images taken from the perspective of each lens. The composite image 150 can contain information about light intensity and direction such that it is possible to adjust a viewed focal plane or viewing direction during post-processing of the composite image 150.

Figure 4A:
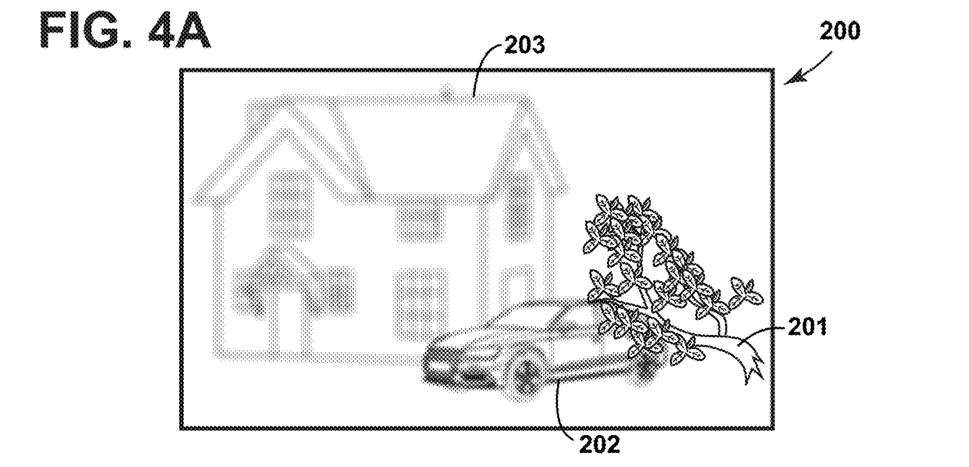
FIGS. 4A-4C illustrate an imaging aspect of the microlens array of FIG. 3.
Figure 4B:
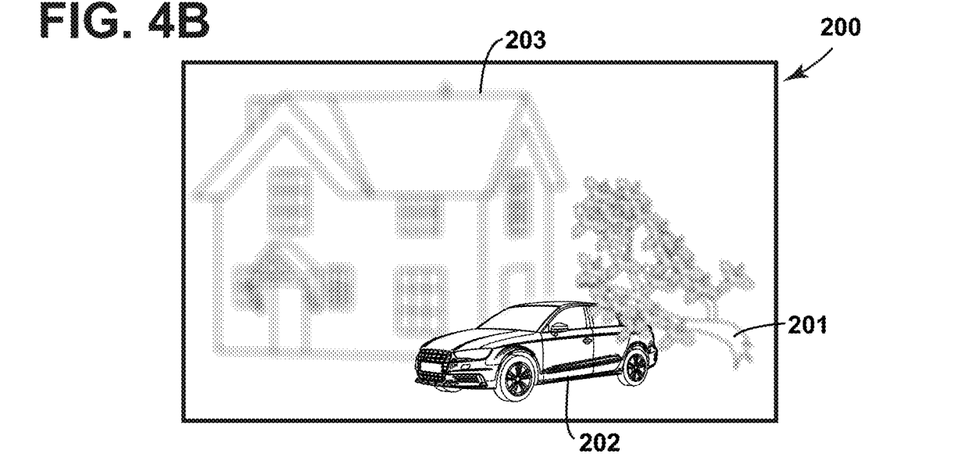
Figure 4C:
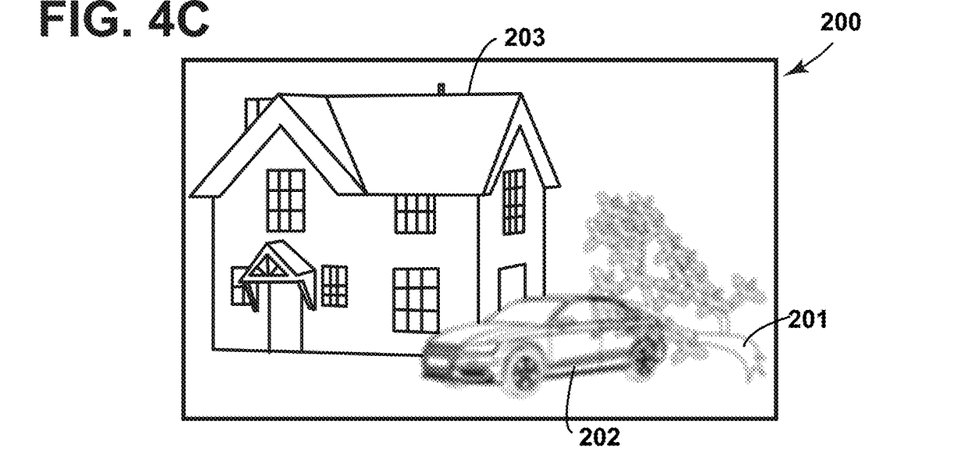

FIGS. 4A-4C illustrate the concept of adjusting the viewed focal plane; in FIG. 4A, an example image 200 shows a foreground object 201 in clear focus while a mid-ground object 202 and a background object 203 are blurred, or out of focus. In FIG. 4B the example image 200 illustrates the focal plane shifting to bring the mid-ground object 202 into focus while the other objects 201, 203 are blurred, and in FIG. 4C the focal plane is further shifted to bring the background object 203 into focus while the other objects 201, 202 are out of focus. In the example shown, it can be appreciated that the depth of field is sufficiently narrow such that only one of the foreground, mid-ground, or background objects is in sharp focus while the others are blurred. It should also be understood that a larger depth of field brings objects into focus at a greater range of distances from the lens.

Figure 5:
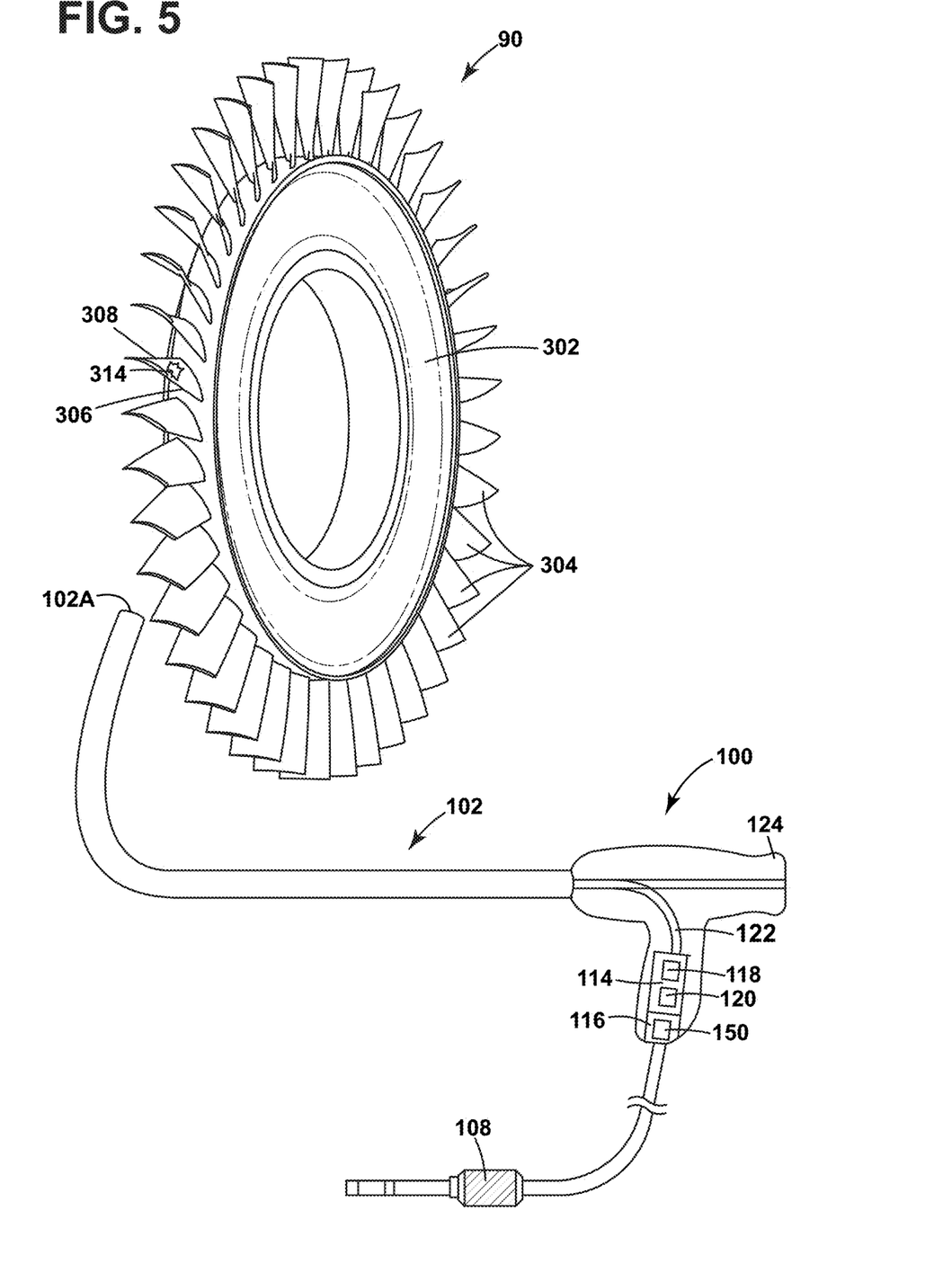
FIG. 5 schematically illustrates the borescope of FIG. 2 utilized for inspecting a blisk in the turbine engine of FIG. 1, with all other portions of the turbine engine removed for clarity.

FIG. 5 illustrates the borescope 100 during inspection of an exemplary blisk 90 comprising a central hub 302 and a plurality of airfoils 304 (such as the HP compressor blades 58). The central hub 302 and the airfoils 304 can be formed from a single piece of metal, and the airfoils 304 can be metallurgically bonded to the hub 302 such that the blisk 90 is formed and machined in one piece. The blisk 90 can be made of any operable material, such as by way of non-limiting example, titanium-based, a nickel-based, cobalt-based, or iron-based superalloy. Each part of the blisk 90, while machined in one piece, can be made from different alloys or a combination of by way of non-limiting example the aforementioned alloys. It should be understood that the blisk 90 can be in any section of the engine 10 including the fan, compressor, or turbine sections 18, 22, 32.

The airfoil 304 can comprise a leading edge 306 and a trailing edge 308, as well as a damaged portion 314; it will be understood that the damaged portion 314 is for illustrative purposes only and can be located anywhere on the airfoil 304. By way of non-limiting example the damaged portion 314 can include a missing part, a curled portion of material, a broken tip, an indentation, or a fracture in the airfoil 304. The damaged portion 314 can occur due to debris including, but not limited to, foreign object debris in the pressurized airflow 76 or domestic object debris from particles emanating from within the engine 10. It is contemplated that the damaged portion 314 can be identified during a routine inspection of the engine 10 or a blisk 90 inspection.

In the example of FIG. 5, the first end 102A of the probe 102 can be positioned to allow for portions of the blisk 90, such as the airfoil 304, to be imaged with the borescope 100 for the purposes of inspection as described above. It is contemplated that the elongated probe 102 can be moved or threaded through a dedicated borescope conduit, an air flow channel, or any other suitable conduit within the engine 10, where the conduit can provide access to regions including, but not limited to, the combustor 30, HP turbine 34, LP turbine 36, or blades or airfoils within the engine 10 for inspection. In such an example, it is possible for the inspection process to be performed without need for removal or disassembly of the engine 10.

Figure 6:
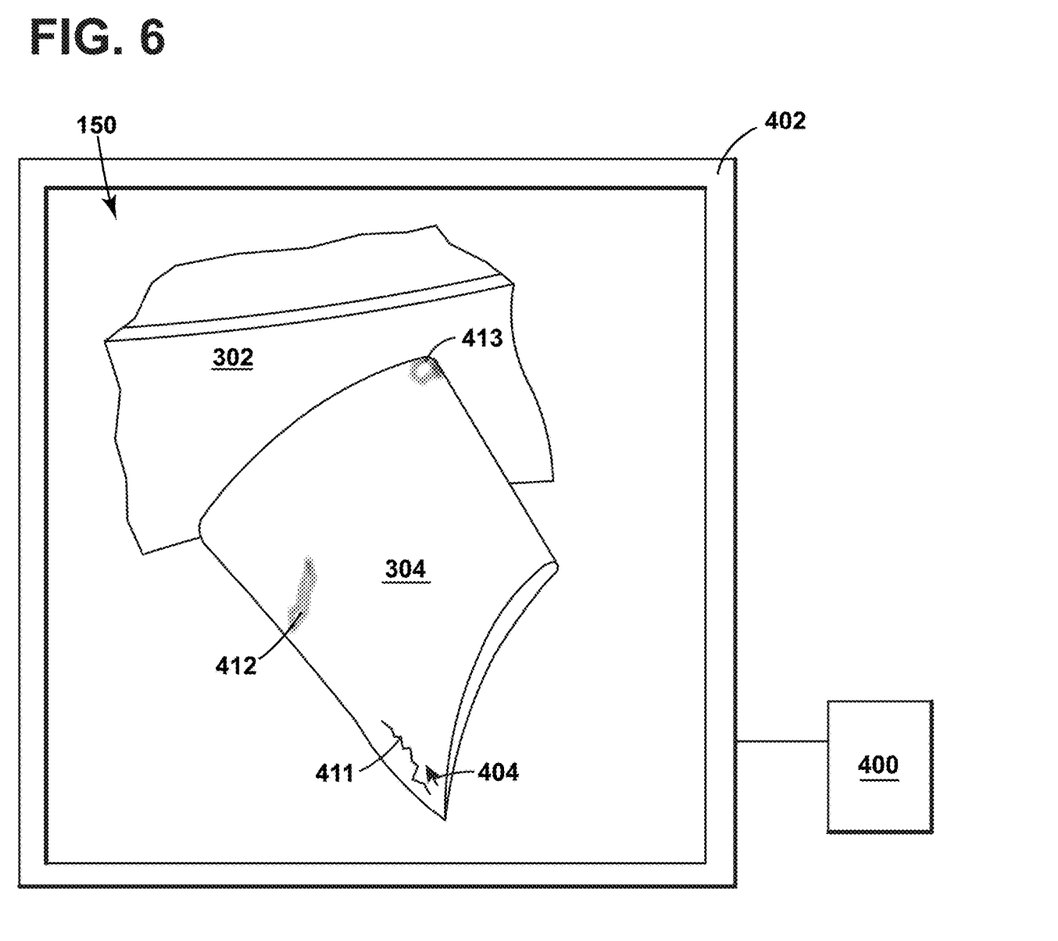
FIG. 6 illustrates an exemplary borescope image of the blisk of FIG. 5 according to a first aspect.

When the first end 102A is in a desired position, the light source 108 can illuminate a portion of the airfoil 304, and the imaging device 114 can produce a composite image 150. The composite image 150 can be viewed in real time through the display 124, or the composite image 150 can also be stored in memory 116 where a computer system 400 having a monitor 402 can be used to process the image 150. FIG. 6 illustrates the computer system 400 including the monitor 402 displaying the composite image 150 in a first view, where the image perspective points along the airfoil 304 looking toward the hub 302 as shown.

A first region 411, a second region 412, and a third region 413 are visible on the airfoil 304, and these regions may indicate damage to the airfoil 304. In this first exemplary view, the first region 411 is in focus and damage to the airfoil 304 (such as a crack) is visible to an observer. The second and third regions 412, 413 are in different focal planes from the first region 411 and are out of focus or blurred; it may not be possible to discern in this view whether these out-of-focus regions include damage.

Figure 7:
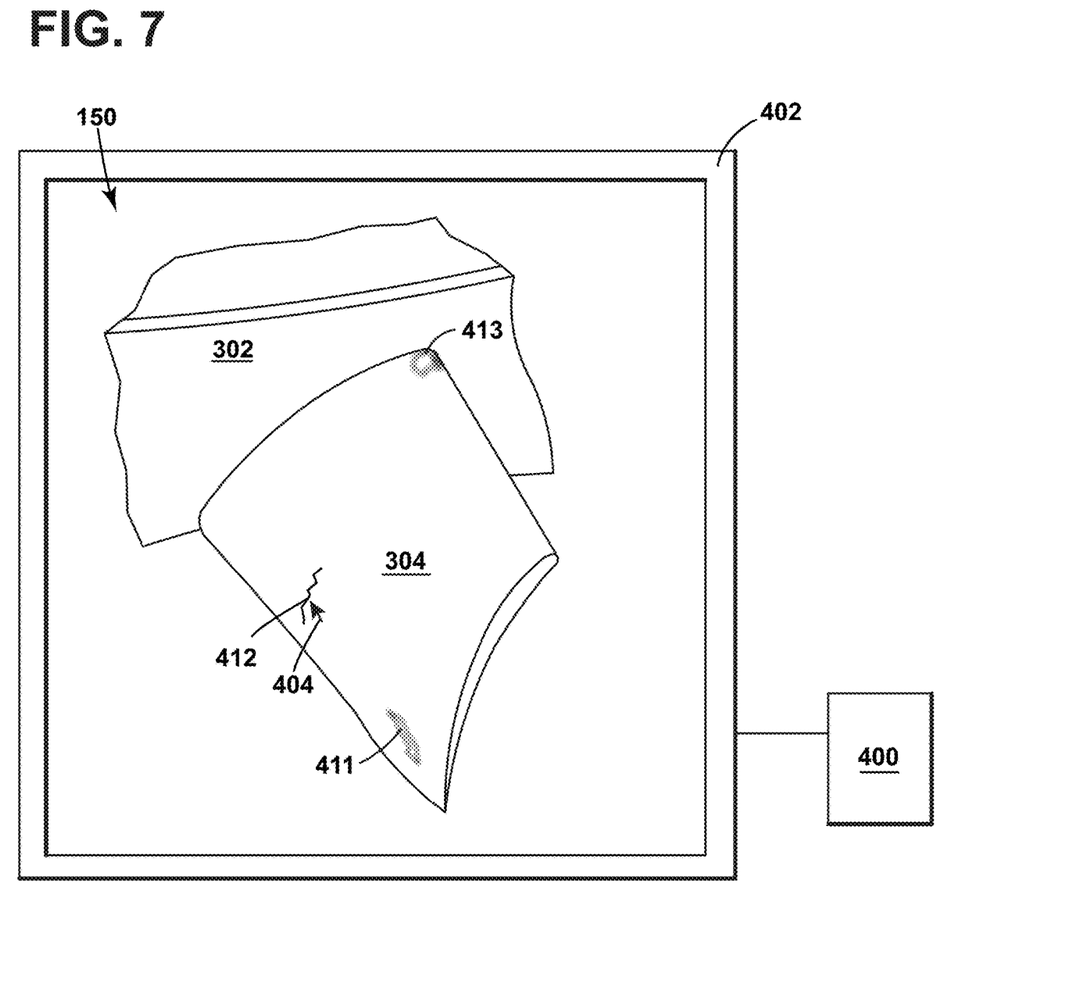
FIG. 7 illustrates an exemplary borescope image of the blisk of FIG. 5 according to a second aspect.

A mouse pointer 404 is shown near the first region 411; a user can move the mouse pointer 404 to select the second region 412 and generate an exemplary second view of the composite image 150 as shown in FIG. 7. The computer system 400 can process the composite image 150 to shift the observed focal plane and bring the second region 412 into focus while the first and third regions 401, 403 become out of focus. In this view, it can be seen that the second region 412 includes damage to the airfoil 304.

Figure 8:
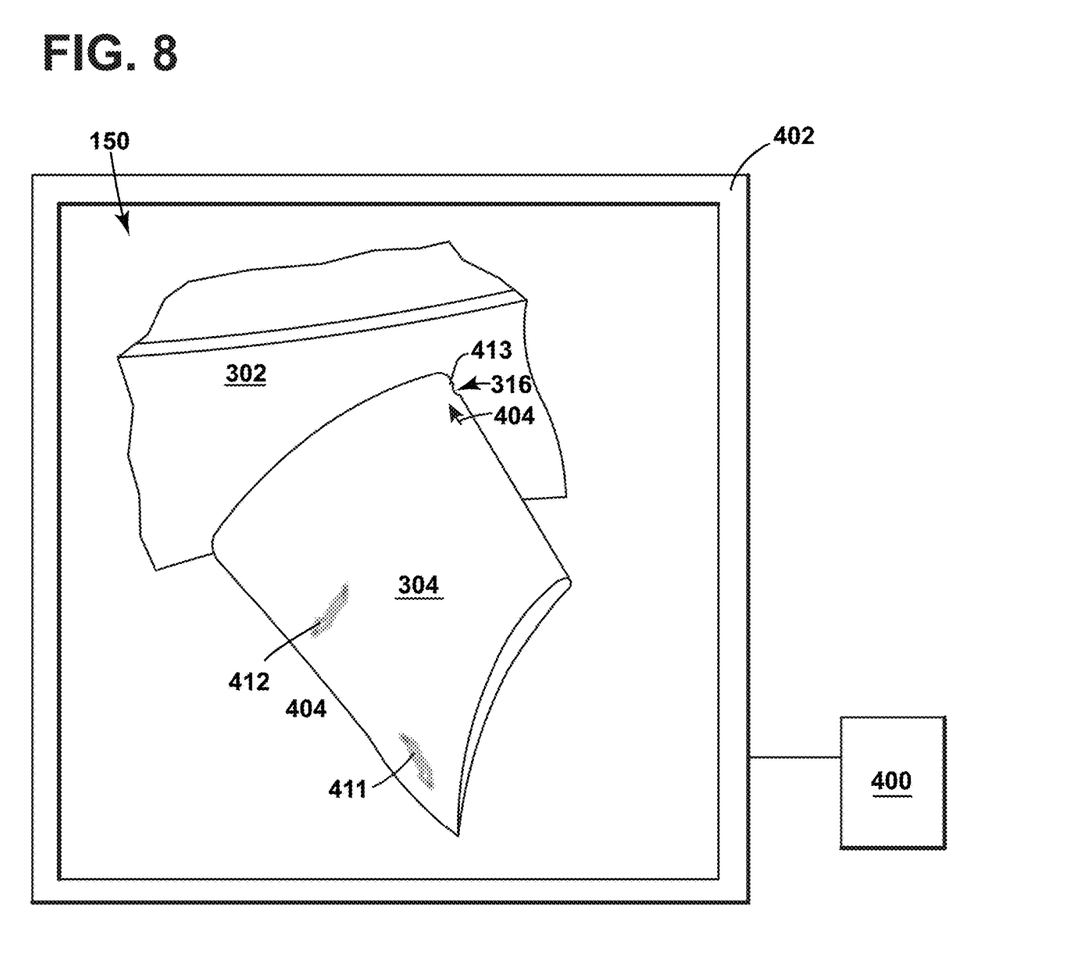
FIG. 8 illustrates an exemplary borescope image of the blisk of FIG. 5 according to a third aspect.

The mouse pointer 404 can be used to select the third region 413 and generate an exemplary third view as shown in FIG. 8. The computer system 400 can once again shift the observed focal plane of the composite image 150 to bring the selected third region 413 into focus while the first and second regions 411, 412 become out of focus. In this view, it can be observed that the third region 413 includes a structural element such as a film hole 316, with no damage present to the airfoil 304 in this region.

Figure 9:
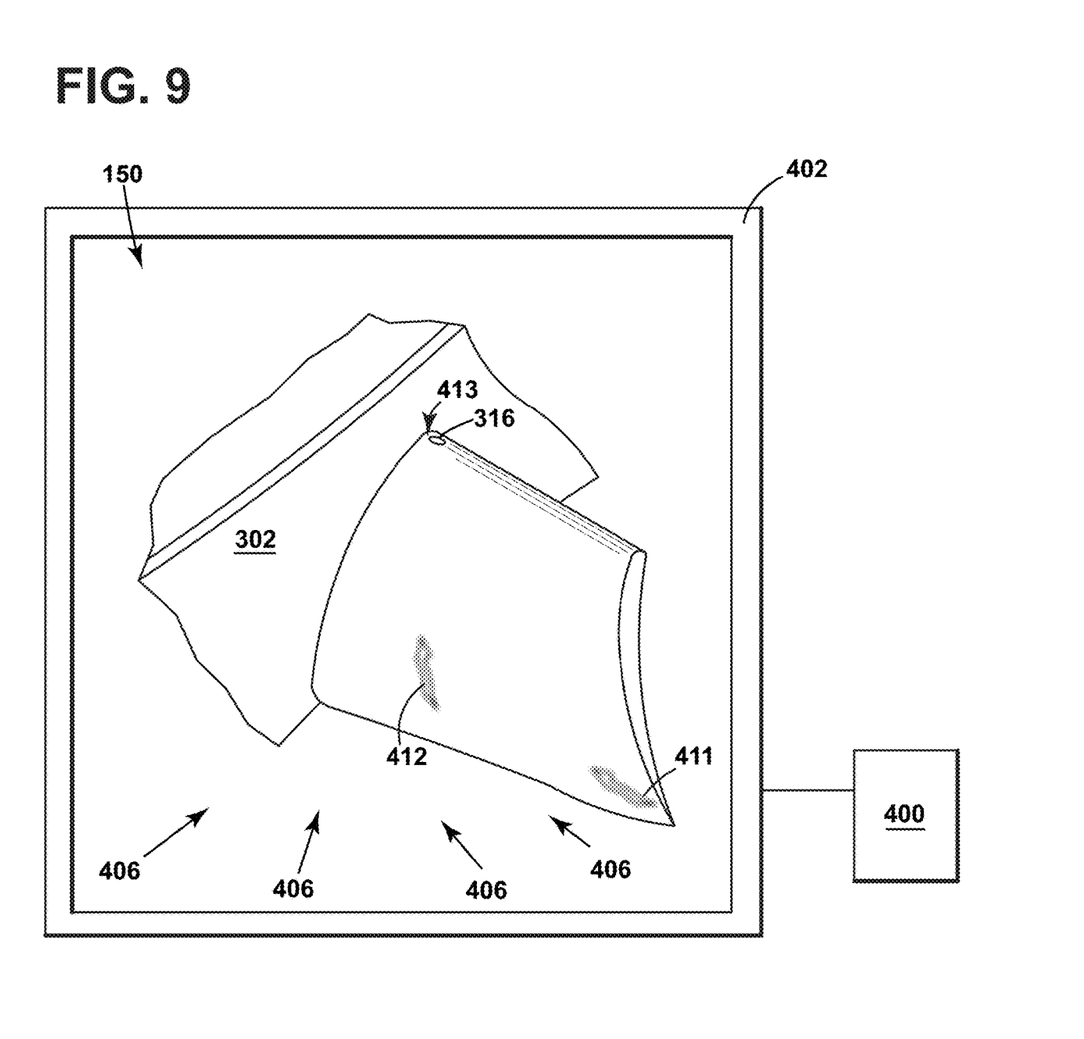
FIG. 9 illustrates an exemplary borescope image of the blisk of FIG. 5 according to a fourth aspect.

In the example of FIG. 8, the film hole 316 is illustrated at the leading edge 306 of the airfoil 304 with only a portion of the film hole 316 visible. Because the microlens array 104 within the borescope 100 forms a plurality of optical images from different perspectives, it is also possible to use the computer system 400 to change the field of view of the composite image 150. FIG. 9 illustrates a fourth view of the composite image 150 where the third region 413 is in focus, and the perspective has been shifted to reveal the entire film hole 316. Exemplary perspective options are illustrated with viewing-direction arrows 406.

While described herein in terms of a mouse pointer 404, it should be understood that views of the composite image 150 can be generated during processing using a variety of methods including, but not limited to, selecting from a list of menu options or using keyboard shortcuts or mouse gestures. In addition, it should be understood that the composite image 150 can also be viewed in real time through the display 124, and in one example the display 124 can also be capable of adjusting the focal plane or viewing direction in a manner similar to the computer system 400 as described herein. In another non-limiting example, the display 124 can select a fixed viewing direction and a fixed focal plane, generating an exemplary view of the composite image 150 in real time for an operator.

It should be appreciated that other optical factors such as aperture size or lens focal length can determine the depth of field and how much of the airfoil 304 is in focus at a given time. While the examples of FIGS. 6-9 illustrate one selected region being in focus with other regions out of focus, it is contemplated that the borescope 100 can have a sufficiently large depth of field to bring multiple regions into focus simultaneously.

It is further contemplated that the views generated from the composite image 150 can be processed by the computer system 400 to create a digital, three-dimensional model of the airfoil 304 or any other component inspected with the borescope 100. In such a case, the three-dimensional model could contain all data obtained about the engine component during a given inspection, including the size or position of damaged portions, and subsequent inspections could be compared to monitor the state of the engine component.

A three-dimensional model from the composite image 150 could also be used to form a solid-part representation of the engine component in the state inspected by the borescope 100, using additive manufacturing or other suitable processes. Any damaged regions or unexpected surface features could also be replicated on the solid part for further study after inspection. In addition, subsequent inspections with the borescope 100 could be used to generate solid parts representing the engine component at various stages over its life cycle; it can be appreciated that such a process could aid in understanding how a given engine component experiences wear or fatigue over its life cycle during operation of the engine 10.

A method for inspecting the turbine engine 10 can include inserting the probe 102 which carries the microlens array 104 into an air flow conduit of the turbine engine 10, and moving the probe 102 through the conduit until the first end 102A is proximate a component of interest such as the blisk 90 as described above. The individual lenses 164 within the array 104 can each form an optical image, and the imaging device 114 can produce the composite image 150, or a set of composite images 150, from the collected optical images formed by the array 104. In one non-limiting example, the imaging device 114 can collect a plurality of optical images from each lens 164, such as by repeatedly collecting optical images from each lens 164 several times per second while the probe 102 remains in a fixed position. The collection of optical images can be processed by the imaging device 114 to produce the composite image 150, and the repetitive-collection process can reduce electronic noise in the composite image 150. The set of composite images 150 can be stored in the memory 116 for processing by the computer system 400 as described above.

Aspects described in the present disclosure provide for a variety of benefits. It can be appreciated that images collected with traditional borescopes are taken with a fixed focal plane and perspective, and the ability to change the focal plane or perspective during post-processing of the composite image can provide for reduced inspection time with improved information quality. An additional benefit can be found in the ability to visualize a model of the engine component from a set of composite images, where the inspection process can continue after the initial use of the borescope.

It should be understood that application of the disclosed design is not limited to turbine engines with fan and booster sections, but is applicable to turbojets and turboshaft engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A borescope for producing a composite image within an unlit, closed conduit, the borescope comprising:
    an elongated probe having a multi-dimensional microlens array located at a first end of the probe used within the closed conduit, where the multi-dimensional microlens array includes at least a first lens located near a center of the first end and a second lens located near an edge of the first end;
    an artificial light source illuminating a space proximate the multi-dimensional microlens array within the closed conduit;
    an imaging device in data communication with the multi-dimensional microlens array converting light from the multi-dimensional microlens array into the composite image; and
    a memory storing the composite image.

2. The borescope of claim 1 further comprising a display in data communication with the multi-dimensional microlens array or the imaging device to display the composite image.

3. The borescope of claim 2 wherein the display is mounted to the probe and provides real-time viewing of the composite image.

4. The borescope of claim 3 further comprising a fiber optic cable providing data communication between the imaging device, the display, the memory, or the multi-dimensional microlens array.

5. The borescope of claim 1 wherein the imaging device is in data communication with a computer system processing the composite image.

6. The borescope of claim 5 wherein the composite image can be used to construct a three-dimensional model.

7. The borescope of claim 6 wherein the three-dimensional model can be used to additive manufacture a turbine engine component.

8. The borescope of claim 1 wherein the closed conduit is a turbine engine air flow conduit.

9. The borescope of claim 8 wherein the turbine engine air flow conduit provides access to a combustion chamber, an HP turbine, an LP turbine, or a blade element for inspection.

10. The borescope of claim 1 wherein the probe is flexible.

11. The borescope of claim 1 further comprising a plurality of lenses of equal optical properties.

12. The borescope of claim 1 further comprising a plurality of lenses wherein at least two of the plurality of lenses have different focal lengths.

13. A method of inspecting a turbine engine, the method comprising:
    inserting a probe having a first end carrying a multi-dimensional microlens array with at least a first lens located at a center of the first end and a second lens located at an edge of the first end into an air flow conduit of the turbine engine;
    moving the probe through the air flow conduit;
    collecting at least one image from the at least the first lens and the second lens;
    producing at least one composite image from the at least one collected image; and
    storing the at least one composite image in an imaging device in data communication with the multi-dimensional microlens array.

14. The method of inspecting the turbine engine of claim 13 further comprising viewing the composite image through a display in real time.

15. The method of inspecting the turbine engine of claim 14 further comprising processing the composite image to create a three-dimensional model.

16. The method of inspecting the turbine engine of claim 15 further comprising transmitting the at least one composite image via a fiber optic cable to the display and the imaging device.

17. A borescope for inspecting a turbine engine having a core, the borescope comprising:
    an elongated probe having a multi-dimensional microlens array on a first end, where the multi-dimensional microlens array includes at least a first lens located at a center of the first end and a second lens located at an edge of the first end, for inspecting the core of the turbine engine having a compressor, combustor, and turbine in axial flow arrangement;
    a light source illuminating a portion of the core proximate the multi-dimensional microlens array;
    an imaging device in data communication with the multi-dimensional microlens array converting light from the multi-dimensional microlens array into a composite image; and
    a memory storing the composite image.

18. The borescope of claim 17 further comprising a display in data communication with the multi-dimensional microlens array or the imaging device to display the composite image.

19. The borescope of claim 18 wherein the display provides real-time viewing of the composite image.

20. The borescope of claim 18 further comprising a fiber optic cable providing data communication between the imaging device, the display, the memory, or the multi-dimensional microlens array.

* * * * *